(12) United States Patent
Chen et al.

(10) Patent No.: US 12,710,825 B2
(45) Date of Patent: Aug. 18, 2026

(54) GESTURE RECOGNITION WITH HAND-OBJECT INTERACTION

(71) Applicant: Apple Inc., Cupertino, CA (US)

(72) Inventors: Lailin Chen, Kirkland, WA (US); Ashwin Kumar Asoka Kumar Shenoi, San Jose, CA (US); Daniel J. Brewer, San Jose, CA (US); Eslam A. Mostafa, San Jose, CA (US); Itay Bar Yosef, Sunnyvale, CA (US); Julian K. Shutzberg, San Francisco, CA (US); Leah M. Gum, Sunol, CA (US); Martin Meloun, San Jose, CA (US); Minhaeng Lee, Sunnyvale, CA (US); Victor Belyaev, San Jose, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 18/369,127

(22) Filed: Sep. 15, 2023

(65) Prior Publication Data

US 2024/0094825 A1 Mar. 21, 2024

Related U.S. Application Data

(60) Provisional application No. 63/407,601, filed on Sep. 16, 2022.

(51) Int. Cl.

| | |
|---|---|
| ***G06V 40/10*** | (2022.01) |
| ***G06F 3/01*** | (2006.01) |
| ***G06V 10/26*** | (2022.01) |
| ***G06V 40/20*** | (2022.01) |

(52) U.S. Cl.

CPC .............. *G06F 3/017* (2013.01); *G06V 10/26* (2022.01); *G06V 40/10* (2022.01); *G06V 40/28* (2022.01)

(58) Field of Classification Search

CPC ....... G06F 3/017; G06F 3/0488; G06V 10/26; G06V 40/10; G06V 40/28

See application file for complete search history.

(56) References Cited

U.S. PATENT DOCUMENTS

| | | | | |
|---|---|---|---|---|
| 2009/0052785 A1 | 2/2009 | Shamaie | | |
| 2013/0156260 A1* | 6/2013 | Craig | G06V 40/23 | 382/103 |
| 2015/0261318 A1 | 9/2015 | Scavezze et al. | | |
| 2015/0363034 A1* | 12/2015 | Hinckley | G06F 3/017 | 345/173 |

(Continued)

FOREIGN PATENT DOCUMENTS

| | | |
|---|---|---|
| WO | WO 2023/149937 | 8/2023 |

OTHER PUBLICATIONS

International Search Report and Written Opinion from PCT/US2023/032959, dated Dec. 5, 2023, 12 pages.

*Primary Examiner* — Rinna Yi
(74) *Attorney, Agent, or Firm* — BAKERHOSTETLER

(57) ABSTRACT

Aspects of the subject technology provide improved techniques for gesture recognition. Improved techniques may include detecting and/or classifying an interaction between the body part and another object in a scan of the body part, and then controlling recognition of a gesture based on the interaction. In an aspect, recognition parameters may be selected based on the interaction classification that disable recognition of one or more gestures while not disabling recognition of other gestures.

20 Claims, 3 Drawing Sheets

(56) References Cited

U.S. PATENT DOCUMENTS

| | | | | |
|---|---|---|---|---|
| 2016/0018945 | A1* | 1/2016 | Tran | G06V 30/32<br>345/178 |
| 2019/0362557 | A1 | 11/2019 | Lacey et al. | |
| 2023/0222814 | A1* | 7/2023 | Barth | G06V 20/59<br>382/103 |

* cited by examiner

100
SENSOR
104
BODY PART
120
PROXIMTE
AREA 110
DEVICE
102
OBJECT
122
OCCLUDED
DIRECTION
124

200
OBJECT DETECTOR
210
BODY PART
212
OTHER
OBJECTS
214
OBJECTS
SENSOR
202
INTERACTION
DETECTOR
220
INTERACTION
CLASSIFIER
222

INTERACTION INDICATION
GESTURE RECOGNITION
CONTROLLER
230
RECOGNITION PARAMETERS
GESTURE
RECOGNIZER
240
SELECTIVE GESTURE
SUPPRESION
242

GESTURE RECOGNITION WITH HAND-OBJECT INTERACTION

CROSS REFERENCE TO RELATED APPLICATIONS

This application claims the benefit of priority to U.S. Provisional Patent Application No. 63/407,601, entitled "GESTURE RECOGNITION WITH HAND-OBJECT INTERACTION," filed on Sep. 16, 2023, the disclosure of which is hereby incorporated herein in its entirety.

TECHNICAL FIELD

The present description relates generally to gesture recognition, including detection of human hand gestures.

BACKGROUND

Automated gesture recognition generally includes scanning a portion of a human with a sensor, and analyzing the resulting scan data in order to recognize predefined gestures the human. For example, a camera may capture images of a person's arm, or an accelerometer attached to a hand may capture motion data of the hand, and analysis may match patterns in the captured data to predefined gestures, such as American Sign Language hand gestures.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Techniques for improved recognition of a gesture of a body part may include detecting and/or classifying an interaction between the body part and another object in a scan of the body part, and then controlling recognition of a gesture based on the interaction. For example, an interaction between a user's body part, such as a hand, and at least one other object may be detected in a scan of a proximate area of a user. The interaction may be classified, and then gesture recognition on the scan may be controlled based on the classification. In one aspect, all gesture recognition may be disabled, while in another aspect, recognition parameters may be selected based on the classification that disable recognition of one or more gestures while not disabling recognition of other gestures. In this way, gesture recognition quality and reliability may be improved, for example by preventing false positive detection of a gesture.

In an aspect, the likelihood of a user's intention to communicate certain gestures may change depending on what type of interaction is occurring in the scan between a body part and another object. For example, a pinch gesture may include movement of a finger and thumb of the same hand toward each other (and/or touch each other). When a user is holding an object, such as holding a pen in their hand, the user may not intend to signal a pinch gesture, but the touching thumb and finger while holding the pen might confuse a hand gesture recognizer into detecting a pinch gesture. In this example, if the interaction between the hand and pen may be classified as "holding," then disabling recognition of the pinch gesture may improve gesture detection reliability. In one aspect, all gesture recognition may be disabled when a holding interaction is detected. In other aspect, when a hand is holding a pen, recognition of the pinch gesture may be disabled for that hand while other gestures may not be disabled. For example, recognizing a wave gesture by a hand holding a pen may not be disabled, and a pinch gesture performed by a separate hand that is not holding a pen may not be disabled.

Figures 1, 2:
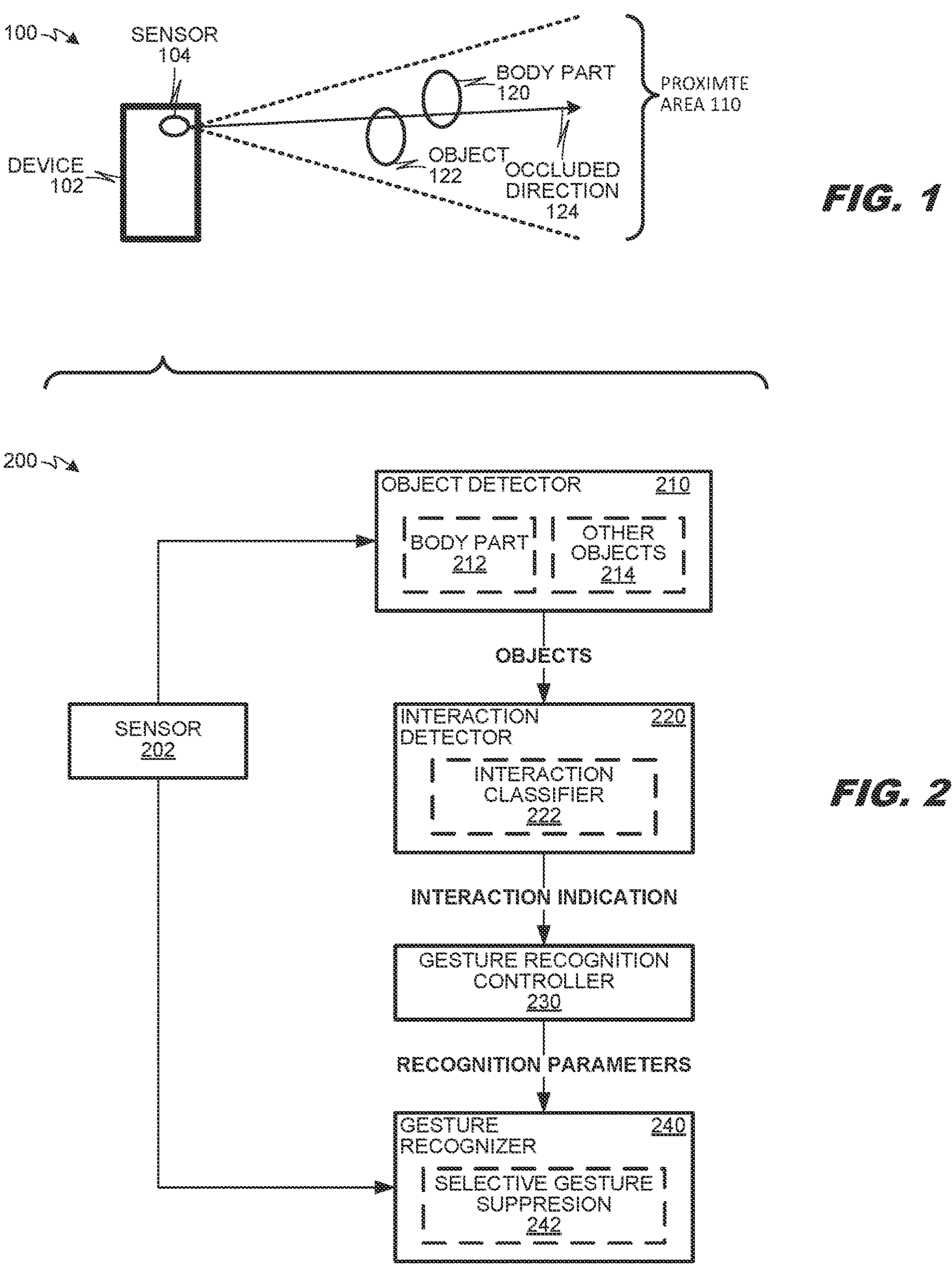
FIG. 1 illustrates an example scenario for gesture recognition.
FIG. 2 illustrates an example system for gesture recognition.

FIG. 1 illustrates an example scenario 100 for gesture recognition. In scenario 100, a device 102 include a sensor 104 for scanning a proximate area 110 including a subject user's body part 120 and another object 122. In aspects, object 122 may be any object in proximate area 1120 other than the body part 120. For example, body part 120 may be a hand, and object 122 may be a pen or a different hand. body part 120 and the other object 122 may interact in a scan of proximate area 110. For example, body part 120 and object 122 may interact such as by one obscuring the other. In the example scenario 100, a portion of body part 120 may be occluded from sensor 104 by object 122 along an occluded direction 124 from sensor 104. In a different scenario not depicted in FIG. 1, a different interaction might include the object 122 occluded by a portion the body part 120. In an aspect, gestures may be performed by the body part, and a gesture recognition process may be controlled by a detected interaction in the scan between the body part 120 and object 122.

In an aspect, a detected body part may include one or more fingers, a hand, an arm, a face, or any other body part capable of gesturing. Gesture recognizer may recognize gestures performed by the detected body part. For example, a finger may perform a pointing gesture; a hand may perform a pinch gesture (finger and thumb moving toward each other) or a release gesture (finger and thumb moving away from each other); an arm may perform a wave gesture; and a face may perform a smile gesture. Gesture recognition controller may disable detection of a gesture based on an interaction between the detected body part and another object. For example, if a finger is pushing a button, a pointing gesture may be disabled; if a hand his holding a pen, both a pinch gesture and a release gesture may be disabled; if an arm is shaking hands with another person's arm; a wave gesture may be disabled; if an apple is being eaten by a face; a smiling gesture may be disabled.

In an aspect, device 102 may be, for example a cell phone, a device worn by a user, such as a headset, or a separate freestanding device capable of scanning proximate area 110. In another aspect, sensor 104 may include a camera or motion sensor or another type of sensor for a user, user's body part, or a proximate area. For example, a camera in a cell phone or headset may scan the proximate area 110 including both the user's body part 120 and other object 122 by capture one or more visible light images of the proximate area 110. In another example, a lidar sensor may scan proximate area 110 by capturing data regarding location and distance from a device 102 to object 112 and body part 120.

FIG. 2 illustrates an example system 200 for gesture recognition. System 200 might be implemented, for example, in device 102 of FIG. 1. System 200 include sensor 202, object detector 210, interaction detector 220, gesture recognition controller 230, and gesture recognizer 240. In operation object detector 210 may detect one or more objects in a scan produced by sensor 202. Interaction detector 220 may detect interactions between two or more objects in the scan, and gesture recognition controller 230 may select recognition control parameters based on an interaction indication produced by interaction detector 220. Gesture recognizer 240 may attempt to recognize gestures performed by detected objects such a body part in the scan using the selected recognition control parameters.

In optional aspects of system 200, a body part detection 212 may be performed separately from detection of other objects 214. For example, a first neural network may be trained to recognize human hands specifically, while a second neural network may be trained to recognize any other type of object in a scan of a proximate area. In another optional aspect, interaction detector may classify an interaction between the body part and another object. For example, an interaction may be classified as either a holding interaction or an occluding interaction, or an interaction classification may indicate a probability of an interaction. In an aspect, an interaction classifier may distinguish between a holding interaction and a partially-occluding interaction without holding.

In an aspect, gesture recognition may be performed by a machine learning system including one or more a machine learning model(s) such as neural network and may receive as inputs, outputs from sensor 202. The machine learning models may have been trained based on outputs from various sensors corresponding to the sensor 202, in order to detect and/or predict a user gesture. When the system 200 detects a user gesture using the sensor 202 and the machine learning models, the system 200 may perform a particular action (e.g., raising or lowering a volume of audio output being generated by the system 200, scrolling through video or audio content at the system 200, other actions at the system 200, and/or generating a control signal corresponding to a selected device and/or a selected gesture-control element for the selected device, and transmitting the control signal to the selected device). In one or more implementations, the machine learning models may be trained based on a local sensor data from the sensor 202 at the system 200, and/or based on a general population of devices and/or users. In this manner, the machine learning models can be re-used across multiple different users even without a priori knowledge of any particular characteristics of the individual users in one or more implementations. In one or more implementations, a model trained on a general population of users can later be tuned or personalized for a specific user of a device such as the system 200.

In an optional aspect, gesture recognizer 240 may include a selective gesture suppression function 242. For example, gesture recognizer may disable all recognition of gestures for a body part but not disable recognition for other body parts, or gesture recognizer may disable certain gestures of a body part but not disable other gestures of that same body part. In an aspect, gesture recognition may be disabled by precluding operations of gesture recognizer 240, or gesture recognition may be disabled by simply suppressing output of a detected gesture. In an aspect, recognition control parameters may indicate which gestures are to be suppressed (box 242) and which gestures should be recognized (and not suppressed).

In another aspect not depicted in FIG. 2, more than one sensor may be used. In a first example, a first sensor, such as a camera, may be used by object detector 210, while a second sensor, such as motion sensor attached to a body part, may be used by gesture recognizer 240.

In other aspects not depicted in FIG. 2, while sensor 202 may be implemented in a device such as 102, other elements of example system 200 may be implemented separately in other devices, such as in a cloud computing system or in a second device near the proximate area and/or the user.

Figure 3:
FIG. 3 illustrates an example method for gesture recognition.
Figure 3:
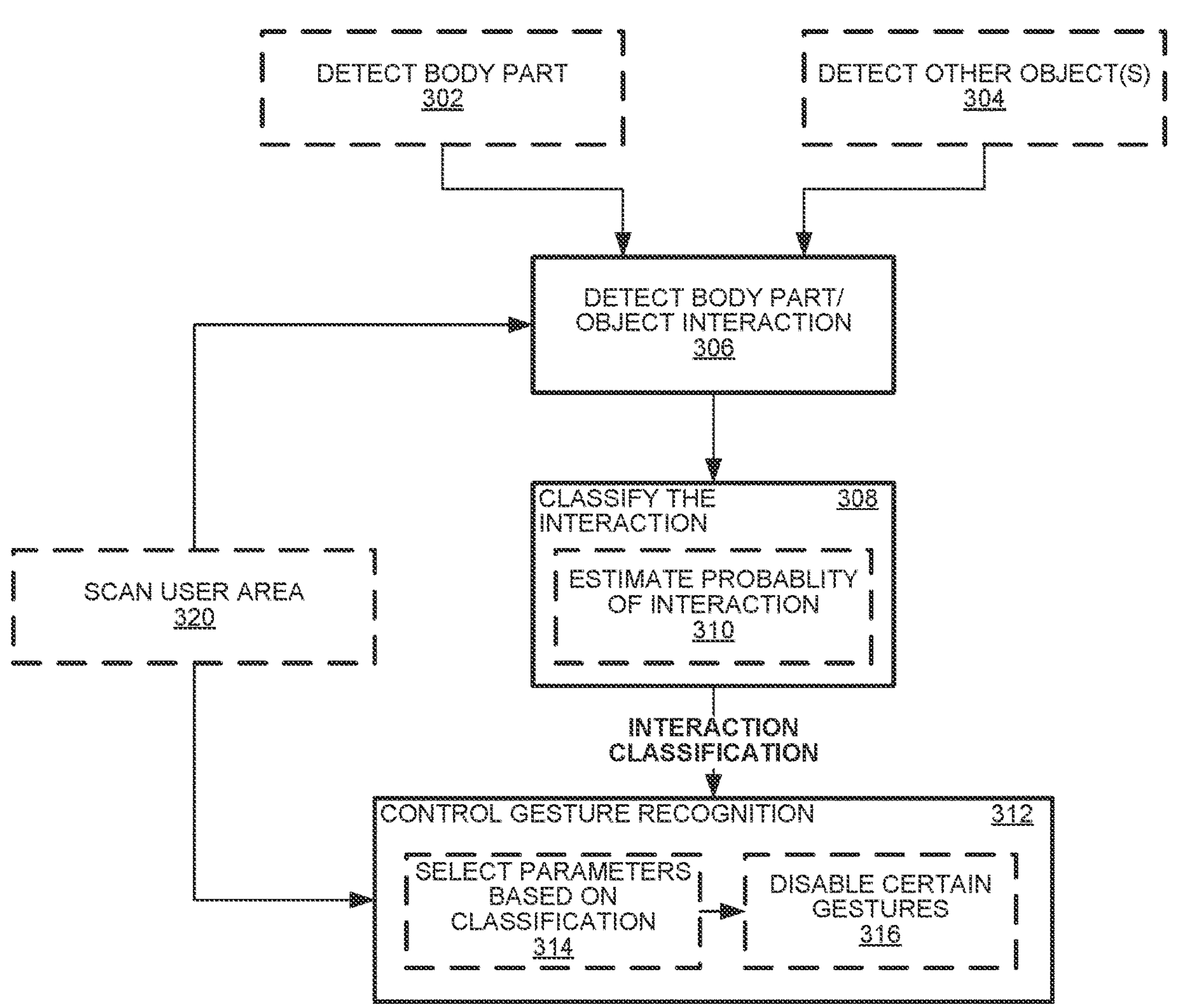

FIG. 3 illustrates an example method 300 for gesture recognition. Method 300 includes detecting an interaction between a body part and another object (box 306) in a scan of a subject user, and classifying the detected interaction (box 308). Gestures by the user may be recognized based on the classification (box 314).

In an optional aspects of method 300, a proximate area of a user may be scanned (box 320), a body part of the user may be detected (box 302), and one or more other objects in the scan may also be detected (box 304). Classifying the interaction (box 310) may include estimating a probability of an interaction between the body part and one or more other objects (box 310). Recognizing gestures (box 213) may include selecting recognition parameters based on the classification (box 314) and/or disabling recognition of certain gestures (box 316).

In an aspect, scanning the user's area (box 320) may be performed with one or more sensors, such as still or motion video camera capturing a scene that includes a proximate area of a user, or a motion sensor (such as an accelerometer) attached to a gesturing body part of the user. In another aspect, the scan used to detect the body part may be different from a scan the used to detect other objects. In another related aspect, the scan used to detect body parts/objects (box 306) may be different from the scan used to control gesture recognition 312. For example, different sensors may be used for object detection and gesture recognition, or different scans taken from the same sensor may be used.

In aspects, as discussed above, a body part may be any portion of a subject user's body capable of expressing a gesture. In an optional aspect, a gesturing body part may be recognized in the scan of the user area (box 302), and other objects may be recognized in the scan of the user area (box 304). In an aspect, detecting the body (box 302) and detecting the other objects (box 304) may be based on different scans, for example from different scans at different times using the same sensor, or from different sensors. In another aspect, controlling gesture recognition (box 312) may be done with the same scan or a different scan (and may user the same sensor or a different sensor) as the detecting a body part/object interaction box 306).

In an aspect, classifying the interaction (box 308) may determine a variety of different possible interaction classifications. For example, a holding interaction classification my indicate a hand body part is holding a pen, a pointing direction classification may indicate both that a finger is pointing and the direction it is pointing in. In another aspect, an interaction classification may distinguish between a holding classification and a partially-occluding classification. In an aspect, a probability of an interaction may be estimated (optional box 310), and the probability may be included in the classification. For example, an interaction classification may indicate a probability that a holding classification applies to a body part and another object.

In an aspect, a gesture recognition process (not depicted in FIG. 3) may include distinguishing between a plurality of possible gestures that the body part is performing, may include detecting if any gesture is being performed by a body part, and may include identifying which body part is performing a gesture. In one aspect, controlling gesture recognition (box 312) may include causing a gesture recognition process to forego or disable part or all of the gesture recognition process based on the interaction classification. For example, when an interaction classification indicates a holding classification, the gesture recognition process may be disabled; and when a different interaction classification other than holding is indicated, the gesture recognition process may be performed (without being disabled).

In an optional aspect, controlling gesture recognition (box 312) may include selecting recognition control parameters (box 314) for use by a gesture recognition process based on the interaction classification. For example, selected recognition control parameters may indicate that recognition of certain gestures should be disabled (box 316) while other gestures may still be recognized. For example, if an interaction is classified as a holding interaction classification, then recognition control parameters may be selected to indicate that specific gestures, such as pinch and release gestures, should be disabled, while other gestures, such as a wave gesture, is not disabled.

In another example recognition control parameters may indicate a bias toward or against recognizing certain gestures. For example, when an interaction classification includes a probability of a certain type of interaction (from box 310), then recognition control parameters may encourage or discourage recognition of a certain gesture corresponding to the type of interaction. For example, recognition of a pinch or release gesture may be discourage based on the probability of a holding interaction classification for a pen. In another example, a gesture indicating a request for a drink may be encouraged based on the probability of a holding classification for an empty cup.

Figure 4:
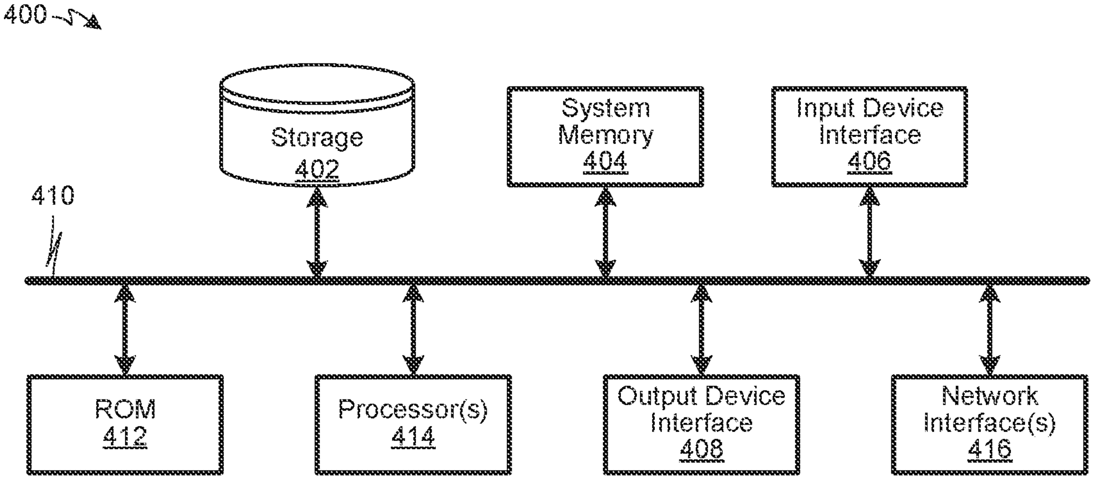
FIG. 4 illustrates an example computing device with which aspects of the subject technology may be implemented.

FIG. 4 illustrates an example computing device 400 with which aspects of the subject technology may be implemented in accordance with one or more implementations. For example, device 400 may be an implementation of device 102 (FIG. 1) or example system 200 (FIG. 2) or a portion thereof, and method 300 (FIG. 3) or a portion thereof may be implemented on computing device 400. The computing device 400 can be, and/or can be a part of, any computing device or server for generating the features and processes described above, including but not limited to a laptop computer, a smartphone, a tablet device, a wearable device such as a goggles or glasses, an earbud or other audio device, a case for an audio device, and the like. The computing device 400 may include various types of computer readable media and interfaces for various other types of computer readable media. The computing device 400 includes a permanent storage device 402, a system memory 404 (and/or buffer), an input device interface 406, an output device interface 408, a bus 410, a ROM 412, one or more processing unit(s) 414, one or more network interface(s) 416, and/or subsets and variations thereof.

The bus 410 collectively represents all system, peripheral, and chipset buses that communicatively connect the numerous internal devices of the computing device 400. In one or more implementations, the bus 410 communicatively connects the one or more processing unit(s) 414 with the ROM 412, the system memory 404, and the permanent storage device 402. From these various memory units, the one or more processing unit(s) 414 retrieves instructions to execute and data to process in order to execute the processes of the subject disclosure. The one or more processing unit(s) 414 can be a single processor or a multi-core processor in different implementations.

The ROM 412 stores static data and instructions that are needed by the one or more processing unit(s) 414 and other modules of the computing device 400. The permanent storage device 402, on the other hand, may be a read-and-write memory device. The permanent storage device 402 may be a non-volatile memory unit that stores instructions and data even when the computing device 400 is off. In one or more implementations, a mass-storage device (such as a magnetic or optical disk and its corresponding disk drive) may be used as the permanent storage device 402.

In one or more implementations, a removable storage device (such as a floppy disk, flash drive, and its corresponding disk drive) may be used as the permanent storage device 402. Like the permanent storage device 402, the system memory 404 may be a read-and-write memory device. However, unlike the permanent storage device 402, the system memory 404 may be a volatile read-and-write memory, such as random-access memory. The system memory 404 may store any of the instructions and data that one or more processing unit(s) 414 may need at runtime. In one or more implementations, the processes of the subject disclosure are stored in the system memory 404, the permanent storage device 402, and/or the ROM 412. From these various memory units, the one or more processing unit(s) 414 retrieves instructions to execute and data to process in order to execute the processes of one or more implementations.

The bus 410 also connects to the input and output device interfaces 406 and 408. The input device interface 406 enables a user to communicate information and select commands to the computing device 400. Input devices that may be used with the input device interface 406 may include, for example, alphanumeric keyboards and pointing devices (also called "cursor control devices"). The output device interface 408 may enable, for example, the display of images generated by computing device 400. Output devices that may be used with the output device interface 408 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, the bus 410 also couples the computing device 400 to one or more networks and/or to one or more network nodes through the one or more network interface(s) 416. In this manner, the computing device 400 can be a part of a network of computers (such as a LAN, a wide area network ("WAN"), or an Intranet, or a network of networks, such as the Internet. Any or all components of the computing device 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:

detecting, by a first device and through one or more sensors of the first device, one or more body parts and one or more other objects other than the first device in a scan of a proximate area of a user;

detecting, by the first device, an interaction in the scan between a body part and at least one of the other objects based on an occlusion detected by the one or more sensors indicating an occlusion of the body part by the at least one of the other objects or an occlusion of the at least one of the other objects by the body part;

classifying, by the first device, the interaction to produce an interaction classification, wherein the interaction classification indicates a probability of a physical interaction between the body part and the at least one of the other objects, the probability being based on the detected occlusion; and controlling, responsive to the interaction classification and by the first device, gesture recognition on the scan by disabling or reducing gesture recognition of one or more gestures for the body part when the probability satisfies a condition, while maintaining or enabling gesture recognition of the one or more gestures for at least one other body part apart from the body part.

2. The method of claim 1, wherein the interaction classification indicates that the body part is holding the at least one of the other objects, and the controlling gesture recognition includes foregoing a performance of a gesture recognition on the scan for at least one gesture based on the interaction classification indicating that the body part is holding the at least one of the other objects.

3. The method of claim 1, wherein the interaction classifying distinguishes between a holding interaction classification and an obscuring interaction classification where the holding interaction classification indicates the body part is holding the at least one or more other objects while the obscuring interaction classification indicate the at least one or more other objects is partially obscuring the body part in the scan without being held by the body part.

4. The method of claim 1, wherein the controlling the gesture recognition disables recognition of at least one gesture when the probability of an interaction is above a threshold, the probability being derived from occlusion-based interaction analysis in the scan.

5. The method of claim 1, wherein the controlling gesture recognition includes a bias toward recognition of a first gesture based on the probability of the interaction classification.

6. The method of claim 1, wherein the controlling gesture recognition includes selecting recognition parameters based on the interaction classification derived from the scan that disable recognition of one or more disabled gestures, while allowing recognition of other gestures.

7. The method of claim 6, wherein the body part is a hand, and the one or more disabled gestures includes a pinch gesture, where the pinch gesture includes a thumb of the hand moving toward a finger of the hand, wherein the pinch gesture is detected from the scan.

8. The method of claim 6, wherein the body part is a hand, and the one or more disabled gestures includes a release gesture, where the release gesture includes a thumb of the hand moving away from touching a finger of the hand, wherein the release gesture is detected from the scan.

9. The method of claim 1, wherein the body part includes one or more of: a finger, a hand, an arm, a face.

10. The method of claim 1, wherein the body part corresponds to a first limb of the user, and wherein the at least one other body part corresponds to a second limb of the user, the second limb on an opposing part of the user than the first limb.

11. A device, comprising:

one or more sensors;

a processor, and a memory storing instructions that when executed by the processor cause the device to:

detect through the one or more sensors of the device one or more body parts and one or more other objects other than the device in a scan of a proximate area of a user;

detect an interaction in the scan between a body part and at least one of the other objects based on an occlusion detected by the one or more sensors indicating an occlusion of the body part by the at least one of the other objects or an occlusion of the at least one of the other objects by the body part;

classify the interaction to produce an interaction classification, wherein the interaction classification indicates a probability of a physical interaction between the body part and the at least one of the other objects, the probability being based on the detected occlusion; and control, responsive to the interaction classification, gesture recognition on the scan by disabling or reducing gesture recognition of one or more gestures for the body part when the probability satisfies a condition, while maintaining or enabling gesture recognition of the one or more gestures for at least one other body part apart from the body part.

12. The device of claim 11, wherein the interaction classification indicates that the body part is holding the at least one of the other objects, and the controlling gesture recognition includes foregoing a performance of a gesture recognition on the scan for at least one gesture based on the interaction classification indicating that the body part is holding the at least one of the other objects.

13. The device of claim 11, wherein the interaction classifying distinguishes between a holding interaction classification and an obscuring interaction classification where the holding interaction classification indicates the body part is holding the at least one or more other objects while the obscuring interaction classification indicate the at least one or more other objects is partially obscuring the body part in the scan without being held by the body part.

14. The device of claim 11, wherein the controlling the gesture recognition disables recognition of at least one gesture when the probability of an interaction is above a threshold.

15. The device of claim 11, wherein the controlling gesture recognition includes a bias toward recognition of a first gesture based on the probability of the interaction classification.

16. A computer readable memory storing instructions that, when executed by a processor, cause the processor to:

detect, by one or more sensors of a first device, one or more body parts and one or more other objects other than the first device in a scan of a proximate area of a user;

detect an interaction in the scan between a body part and at least one of the other objects based on an occlusion detected by the one or more sensors indicating an occlusion of the body part by the at least one of the other objects or an occlusion of the at least one of the other objects by the body part;

classify the interaction to produce an interaction classification, wherein the interaction classification indicates a probability of a physical interaction between the body part and the at least one of the other objects, the probability being based on the detected occlusion; and control, responsive to the interaction classification, gesture recognition on the scan by disabling or reducing gesture recognition of one or more gestures for the body part when the probability satisfies a condition, while maintaining or enabling gesture recognition of the one or more gestures for at least one other body part apart from the body part.

17. The memory of claim 16, wherein the interaction classification indicates that the body part is holding the at least one of the other objects, and the controlling gesture recognition includes foregoing a performance of a gesture recognition on the scan for at least one gesture based on the interaction classification indicating that the body part is holding the at least one of the other objects.

18. The memory of claim 16, wherein the interaction classifying distinguishes between a holding interaction classification and an obscuring interaction classification where the holding interaction classification indicates the body part is holding the at least one or more other objects while the obscuring interaction classification indicate the at least one or more other objects is partially obscuring the body part in the scan without being held by the body part.

19. The memory of claim 16, wherein the controlling the gesture recognition disables recognition of at least one gesture when the probability of an interaction is above a threshold.

20. The memory of claim 16, wherein the controlling gesture recognition includes a bias toward recognition of a first gesture based on the probability of the interaction classification.

* * * * *